UNITED STATES PATENT OFFICE.

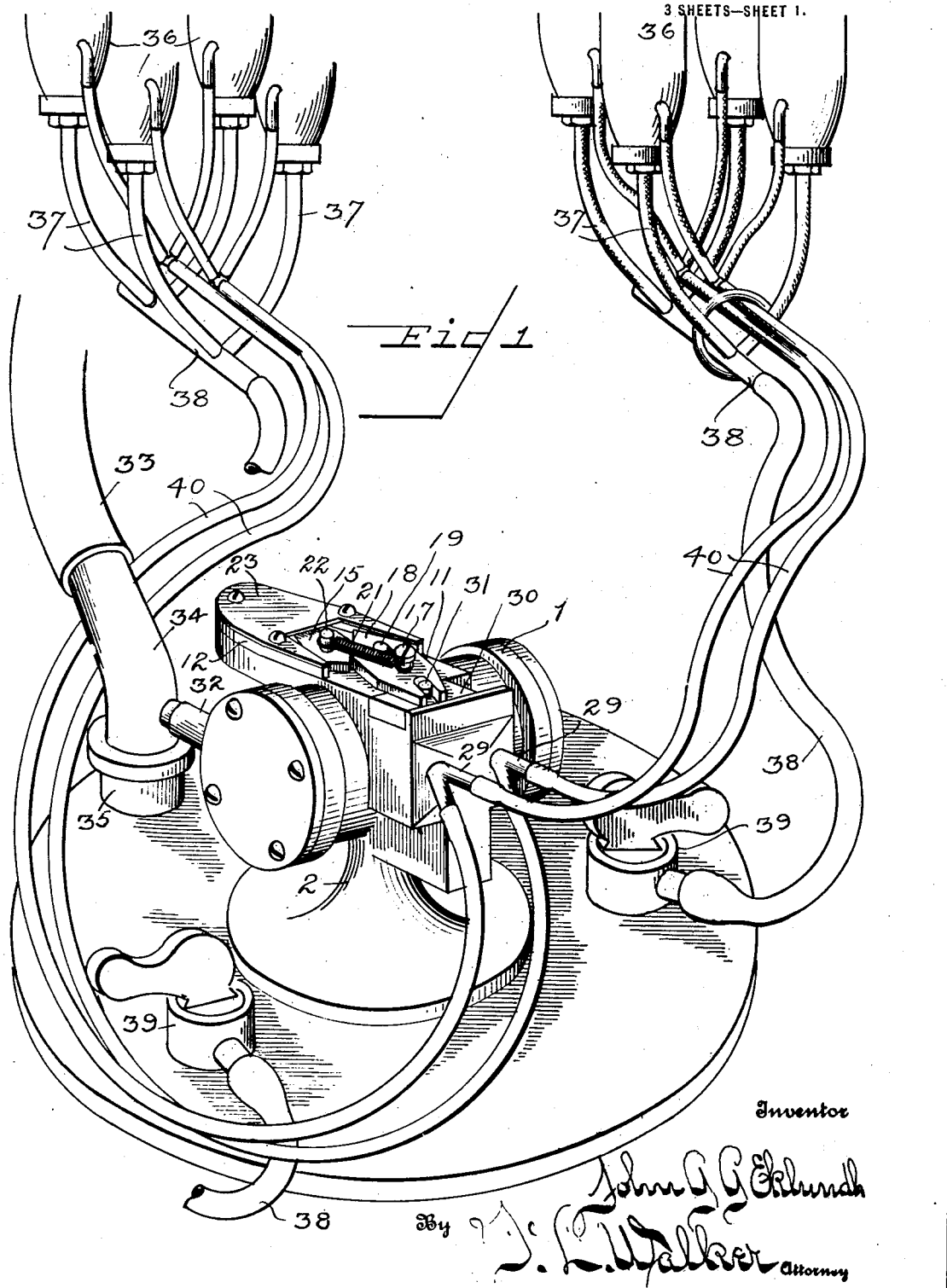

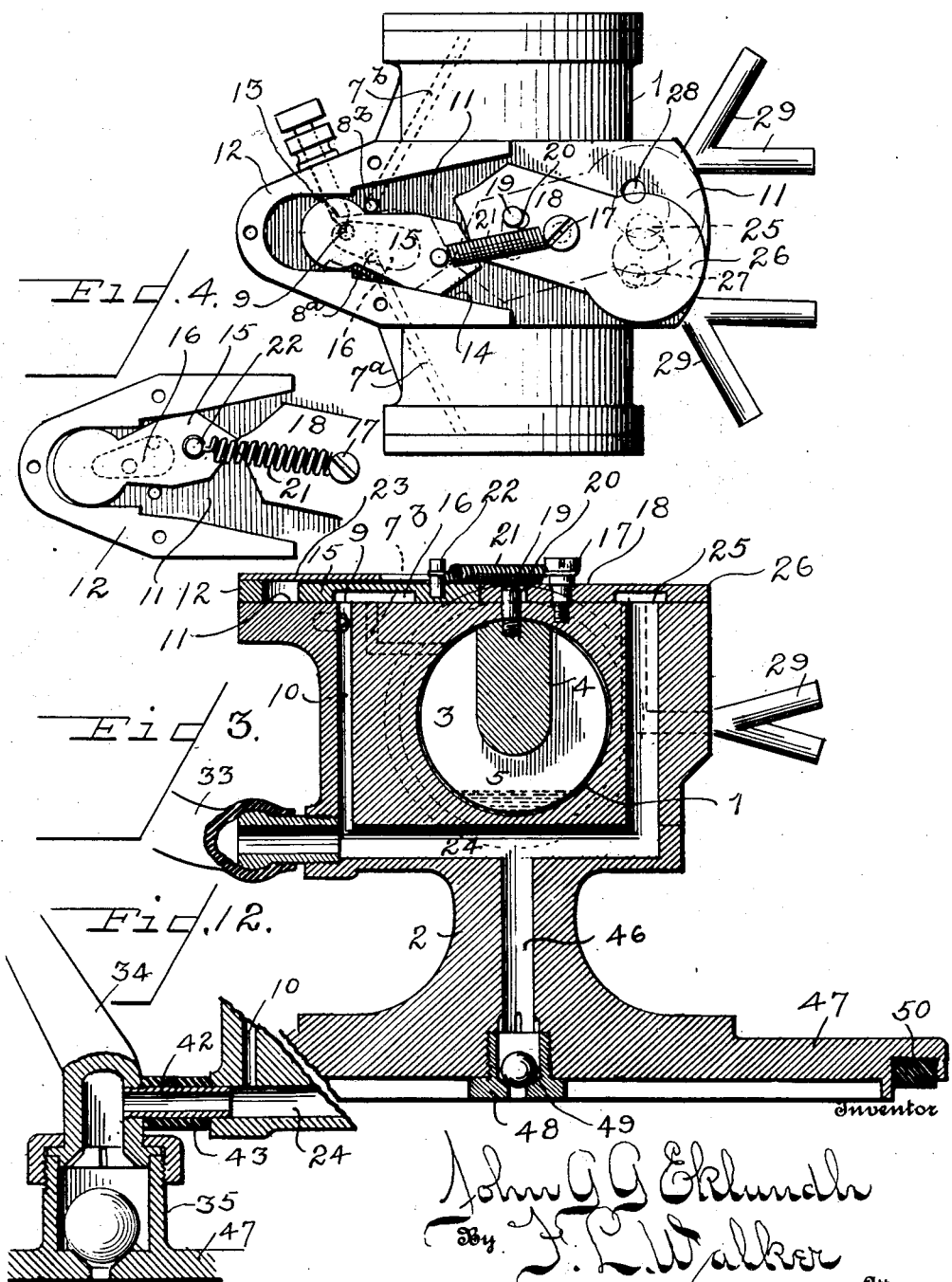

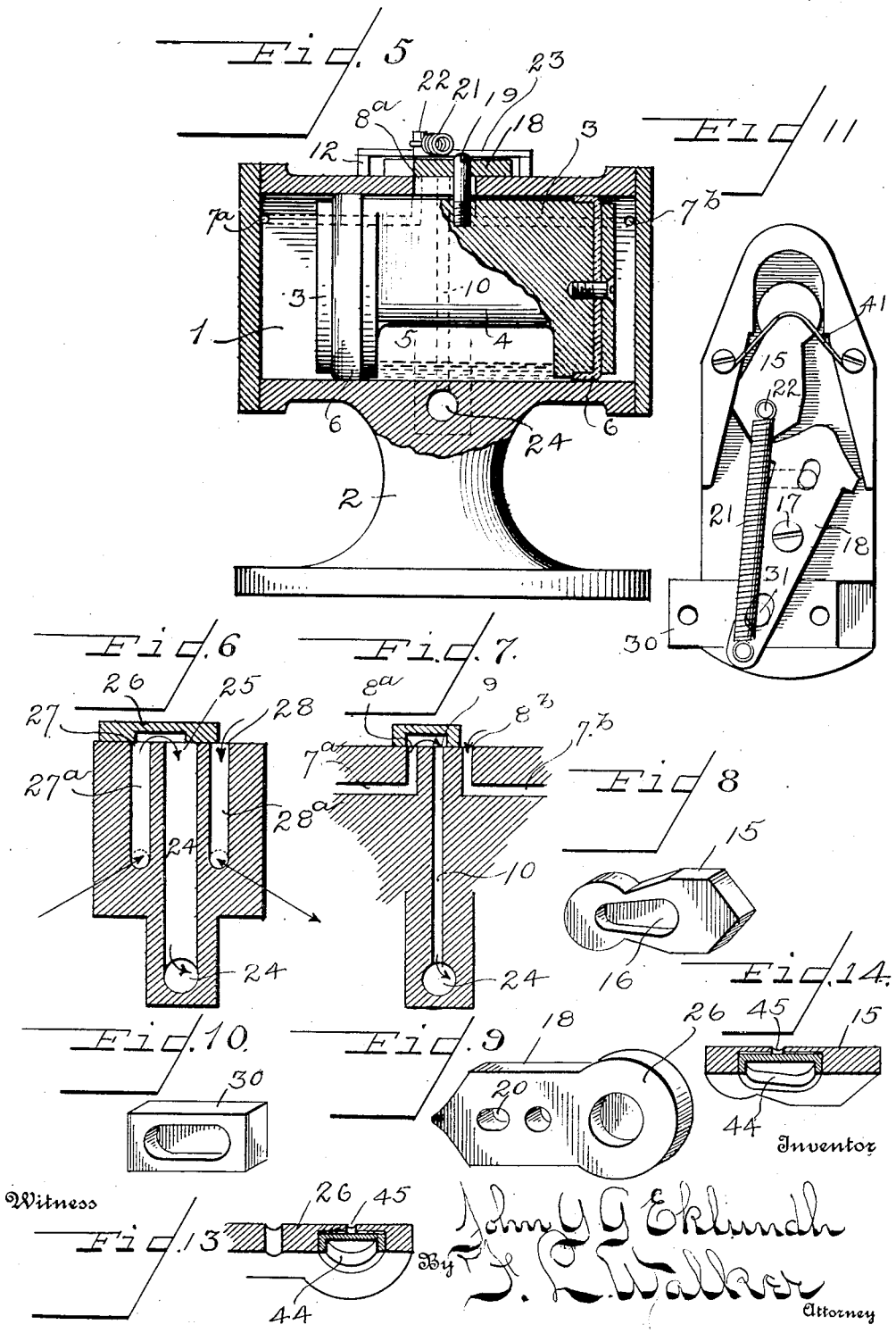

JOHN G. G. EKLUNDH, OF COLUMBUS, OHIO, ASSIGNOR TO THE UNIVERSAL MILKING MACHINE COMPANY, A CORPORATION OF OHIO.

PULSATOR FOR MILKING-MACHINES.

1,386,246.     Specification of Letters Patent.     Patented Aug. 2, 1921.

Application filed January 23, 1919. Serial No. 272,679.

*To all whom it may concern:*

Be it known that I, JOHN G. G. EKLUNDH, a subject of the King of Sweden, residing at Columbus, in the county of Franklin and State of Ohio, have invented certain new and useful Improvements in Pulsators for Milking-Machines, of which the following is a specification.

My invention relates to milking apparatus and more particularly to a pulsator therefor. While the pulsator forming the subject matter hereof has been shown in conjunction with teat cups of the inflation or pulsation type operated by intermittent variation of air pressure therein, it is to be understood that the pulsator is not limited to such association but may be used in any application where an alternation of air pressure or the effect of suction or exhaustion is to be desired.

The object of the invention is to simplify the structure as well as the means and mode of operation of such devices whereby they will not only be cheapened in construction, but will be more efficient in use, automatic in operation, economical in manufacture, and unlikely to get out of repair.

A further object of the invention is to provide a pulsator which will be automatically operated by variation of air pressure controlled by the action of the pulsator, and more particularly to provide an improved form of alternator or valve shifting and control means. The alternating mechanism is especially adapted to prevent the operation of the valve until the pulsator piston has reached the limit of its stroke, and to thereupon effect the immediate and instantaneous reversal of the valve.

A further object of the invention is to provide for the operation of duplex units wherein two groups of teat cups are simultaneously operated, by alternating the operation of subdivisions of each group of teat cups.

With the above primary and other incidental objects in view as will more fully appear in the specification, the invention consists of the features of construction, the parts and combinations thereof, and the mode of operation, or their equivalents, as hereinafter described and set forth in the claims.

Referring to the drawings, Figure 1 is a perspective view of the pulsator forming the subject matter hereof, mounted upon the lid or cover of the milk pail or receiver. Fig. 2 is a top plan view of the pulsator with the cover plate removed. Fig. 3 is a transverse sectional view. Fig. 4 is a detail view showing the control valve in the opposite position from that shown in Fig. 2, but at the moment of reversal to the position shown in Fig. 2. Fig. 5 is a longitudinal sectional view. Figs. 6 and 7 are detail views of the pulsator valve and control valve connections respectively. Fig. 8 is a perspective view of the control valve. Fig. 9 is a perspective view of the pulsator valve combined with the control valve actuator as shown in Fig. 2. Fig. 10 is a detail perspective view of the pulsator valve as shown in Fig. 11. Fig. 11 discloses a modification of the connection for the valve actuating spring. Fig. 12 illustrates a convenient connection for the main suction conduit with the pulsators.

Figs. 13 and 14 illustrate floating valve constructions for the pulsator and control valve in which the main element becomes merely a valve carrier.

Like parts are indicated by similar characters of reference throughout the several views.

In constructing the device there is employed a cylinder 1 mounted upon a suitable standard or base 2. The top of the cylinder is extended and shaped to accommodate the alternating valve mechanism hereafter described. Located within the cylinder 1 is a reciprocatory piston 3 comprising two heads interconnected by a web or tie portion 4 of reduced dimensions whereby there is formed intermediate the piston heads a chamber 5 for lubricant. Each piston head embodies a leather cup packing 6, or packing member of other suitable material which is slightly larger than the main piston head, whereby the piston will be supported within the cylinder wholly upon such packing member and all wearing or rubbing of metal to metal as the piston reciprocates is eliminated. The provision for a supply of lubricant intermediate the piston heads insures adequate lubrication, ease of operation, and longevity of the parts. The piston is actuated to and fro by air pressure directed to one end or the other by the alternation of a control valve. The preponderance of air pressure necessary to the movement of the piston may be effected either by the exhaustion of air from one end of the cylinder and admission of air at atmospheric pressure to the opposite end of the cylinder, or it may be effected by air under pressure.

The air is supplied to the cylinder 1 and exhausted therefrom through two ducts or conduits 7ª and 7ᵇ leading from the opposite ends of the cylinder beyond the heads of the piston to orifices or ports 8ª and 8ᵇ in the top or deck of the pulsator. The ports 8ª and 8ᵇ and consequently the related ducts 7ª and 7ᵇ are alternately opened to atmosphere and connected with a suction or exhaust port 9 pertaining to an exhaust duct 10, by the movement of the control valve hereafter described.

The top or deck 11 of the pulsator containing the ports 8ª, 8ᵇ and 9 over which the control valve plays is a smooth flat surface bounded by a flange or rim 12, which forms a guide for the control valve and limits its degree of movement. For convenience of manufacture, the flange or rim 12 is preferably though not necessarily formed separate from the body of the pulsator and attached thereto.

The rim or flange 12 defines an area having straight parallel sides throughout a portion of its length as at 13 while the adjacent portions of the rim or flange are divergent as at 14. The control valve member 15 is a floating element which lies loosely upon the top or deck surface 11 and is free for both sliding and oscillatory movement. It is in no way attached to the body of the pulsator, but floats freely to and fro upon the surface 11 in close relation with which it is held by air pressure due to the exhaustion of air from beneath the valve member through the duct 10. The valve member is provided with a circular head at one end which reciprocates to and fro intermediate the parallel walls 13 of the rim or flange 12 without interfering with the oscillatory movement of the valve. The opposite end of the valve is somewhat pointed or V shaped, while the sides are contracted adjacent to the circular head to afford clearance and insure ample opening of the uncovered port, and adjacent to the V shaped end sufficient length of parallel sides remain to engage the divergent portions of the rim 12 to limit the oscillatory movement of the valve and to guide it in its reciprocatory movement. The under side of the valve 15 is recessed as at 16 to afford a communicating passage between the port 9 and either of the ports 8ª or 8ᵇ in any position of reciprocatory travel of the valve.

Pivoted upon a fixed stud 17 projecting from the top of the pulsator body is an oscillatory valve actuator 18 operated by a stud or pin 19 carried by the pulsator piston and extending through a slot in the cylinder wall into engagement in a slot 20 in the oscillatory actuator 18. The connection is such that as the piston is reciprocated to and fro the actuator 18 is simultaneously oscillated about its pivot stud 17. The actuator 18 lies in the same plane with the valve 15. The operative end of the actuator is pointed or V shaped and possesses a camming action upon the valve 15. The valve 15 is drawn toward the actuator 18 by means of a spring 21 attached at one end to a pin or stud 22 carried by the valve 15 and at its opposite end to the fixed stud 17. The result is that the valve member always tends to approach the actuator with one of the inclined faces of the angular end of the valve in engagement with one of the inclined faces of the angular end of the actuator. The camming action of the interengaged inclined faces tends to hold the valve 15 in engagement with one or the other of the divergent faces 14 of the rim or flange 12. As the V shaped end of the actuator 18 is oscillated toward the valve 15 by the movement of the piston, the interengagement of the inclined cam surfaces forces the valve 15 outward during which movement the circular head of the valve slides between the parallel faces 13 of the rim and the side of the valve follows the divergent face 14 against which it is pressed by the actuator. The pocket or recess in the under side of the valve is of sufficient extent to register with the connected ports throughout such shifting movement. The retrograde movement of the valve continues as the actuator advances until the apex of the actuator reaches the apex of the valve whereupon the spring 21, which has been placed under tension by the movement of the valve, causes the valve to "snap" down the opposite inclined face of the actuator and into engagement with the opposite face 14 of the rim or flange, thereby uncovering the previously covered port leading to the cylinder and covering the port previously open to atmosphere. The relative positions of the members at the moment the valve is tripped over the point of the actuator is clearly shown in Fig. 4 and by dotted lines in Fig. 2.

While during all times of active operation the valve 15 is held in contact with the surface 11 by preponderance of atmospheric pressure, when the pulsator is out of operation and no vacuum is maintained within the duct 10 and beneath the valve 15, the valve would be liable to displacement. To preve⸢ this a cover plate 23 is provided which is attached to the rim or flange 12 and overlies the valve 15, and beneath which the valve moves freely over its seat 11.

The suction or vacuum duct 10 alternately connected with the ports 8ª and 8ᵇ by the shifting of the control valve is a branch duct leading from the main vacuum conduit 24 which extends beneath the cylinder 1 and upward at the opposite side of the cylinder to a port 25 in the top or deck of the pulsator. Referring to the construction shown in Figs. 2 and 3, the actuator 18 has been shown extended beyond the pivotal stud 17 and provided with an enlarged recessed head 26, the recess or pocket of which is adapted to alternately connect the port 25 with ports 27 and 28 at opposite sides of the port 25, as the actuator 18 is oscillated to and fro. The ports 27 and 28 communicate through ducts 27$^a$ and 28$^a$ with Y connections 29 to which the pulsation tubes leading from the teat cups are attached. The actuator 18 being loosely pivoted upon the stud 17 is closely held in contact with the bearing surface containing the ports by atmospheric pressure so long as a partial vacuum is maintained beneath the enlarged head 26 thereof through the conduit 24. The construction is such that when the actuator is at one limit of its stroke the port 25 is connected through the recess of the head 26 with the port 27 and upon reversal of the parts it is connected with the port 28 and the port 27 is opened to atmosphere, thereby alternately exhausting and admitting air to the teat cups connected with the respective Y connections 29. In lieu of this construction a separate valve element may be provided as at 30, Fig. 11 adapted to reciprocate in a straight path of travel under the influence of the actuator 18. In this instance the outer end of the actuator is bifurcated for engagement with a stud 31 in the valve member 30 by which the latter is operated. It has been found in practice that in order to insure a quick movement of the valve 15 it is desirable to form the inclined engaging end of one or the other of the interengaged members slightly arcuate adjacent to its apex. In the drawing this slightly concaved or hollowed formation has been shown in the engaging face of the actuator 18.

The main suction or vacuum conduit 24 of the pulsator is connected through a short flexible conduit section 32 with the main vacuum line 33. The vacuum line 33 is provided with a terminal fitting 34 detachably engaged with a check valve housing 35 located upon the receiver lid or cover and communicating with the interior of said receiver. The connecting section 32 engages with a nipple on the terminal fitting 34 and a similar nipple on the pulsator. There is thus a constant suction or vacuum maintained within the receiver and also through the conduit 24 and branch duct 10 of the pulsator.

In Fig. 1 there are shown two sets or groups of teat cups 36. These cups are of the inflation or pulsation type. All of the cups of each group are connected through branch conduits 37 and a common milk conduit 38 with the inlet cock 39 located on the receiver lid and communicating with the interior thereof.

For pulsation purposes however each group of teat cups is subdivided into two series, each provided with a separate pulsation tube 40. The pulsation tubes of each group do not lead to the same Y connection 29, but one tube 40 from each group leads to each of the connections 29. Thus one subdivision of the group of teat cups is exhausted while air is admitted to the other subdivision thereof, the cups comprising each subdivision being inflated and exhausted alternately. The second group of cups is similarly connected, whereby portions of each group are operated in unison.

The operation is as follows: The main conduit 33 being exhausted exhausts the air from the receiver and through the conduit 24 to the port 25 thence beneath the pulsator valve 26 to the port 27 and conduit 27$^a$, the connection 29 communicating therewith the two pulsation tubes 40, and the subdivision of each group of teat cups connected through the separate tubes 40 with the particular Y connection 29 mentioned.

At the same time the port 28, conduit 28$^a$, the Y connection 29 communicating therewith and interconnected tubes 40 are open for the admission of air to the remaining teat cups of both groups.

At the same time the exhaustion of air or vacuum acts through the branch duct 10, and beneath the control valve 15 through the port 8$^a$ and duct 7$^a$ to exhaust the air from one end of the cylinder 1. At the same time the port 8$^b$ to the duct 7$^b$ leading to the opposite end of the cylinder is open to atmosphere, thereby admitting air thereto which reciprocates the piston toward the exhausted end of the cylinder, carrying with it the actuator 18.

The camming action of the actuator presses the free floating valve 15 rearward, at the same time placing the spring 21 under tension. The recess or pocket in the valve being elongated permits this movement without interfering with the interconnected ports. The movement of the actuator 18 also effects the reversal of the pulsator valve whereby the port 28 is connected with the port 25 thereby exhausting the second series or subdivision of each group of teat cups simultaneously, while admitting air to the first series or subdivisions of teat cups through the port 27 uncovered by the movement of the pulsator valve.

As the piston approaches the limit of its stroke, the nose or apex of the actuator passes that of the valve whereupon the spring immediately retracts the valve which is at the same time shifted laterally by the camming action of the inclined engaging surfaces. The reversal of the valve causes the opposite end of the cylinder to be exhausted and consequently the piston reverses its direction of travel, repeating the same cycle of operations.

In Fig. 11 there is shown a modification in which the spring 21 is connected to the outer end of the actuator 18 in lieu of connecting it to the fixed stud 17. This construction increases the tension of the spring 21 and automatically shifts the spring bodily in the direction in which the valve is to be moved, thereby exerting the pull of the spring more directly in the direction of the movement of the valve. Also in this view a section 41 of spring wire is bent into a bight and bridged across the valve recess between the side flanges 12 of the valve seat. The bight of this spring member bears upon the valve member 15 tending to lightly press it upon its seat without interfering with its movement. This spring wire section 41 likewise prevents the displacement of the valve from its seat and so takes the place of the top plate 23.

In Fig. 12 there is shown a simple and convenient means for connecting the main suction conduit with the pulsator.

Intermediate the terminal fitting 34 of the main conduit 33 is a nipple 42 or short rigid tube having a positive attachment with one of the members and a slip joint with the other member.

In the drawing the tube 42 has been shown screw threaded into the terminal fitting 34 and projecting loosely within the pulsator opening. It will be apparent, however, that these connections may be reversed. Surrounding the nipple 42 is a compressible sleeve 43 of rubber or like material which bears at its opposite ends upon the pulsator and the fitting 34. This sleeve is slightly longer than the intermediate distance between said parts whereby it is under compression when the parts are connected as shown in Fig. 12.

The pulsator and control valves may be provided with auxiliary floating elements 44 loosely mounted in the main valve body, 15, 26 or 30, as shown in Figs. 13 and 14. This floating element is free for movement to and from the valve seat independent of the main body, in the pocket of which it is located. The pocket or recess containing the element 44 is provided with a vent 45 through which atmospheric pressure operates to press the valve element 44 upon its seat.

While the pulsator herein described, may be formed independent of the pail lid upon which it would be subsequently mounted, it will be found desirable to form the pulsator frame or housing and the pail lid as a single integral body, as shown in Fig. 3.

In such a construction, instead of an independent connection 34—35 for the vacuum tube 33 with the pail and a branch 32 to the pulsator, as shown in Fig. 1, there is provided a passage way 46 extending through the stem or standard of the pulsator housing which communicates at one end with the suction passage 24, and at its opposite end opens to the under side of the pail lid 47, thus communicating with the interior of the pail. At its lower end the passage 46 is provided with an insert or plug fitting 48 having therein a valve seat for the ball check 49. In this form of construction the vacuum tube 33 is connected directly to the suction conduit 24 of the pulsator. The lid 47 is provided with the usual marginal flanges between which is seated a rubber gasket 50 adapted to form an air tight closure with the rim of the pail.

From the above description it will be apparent that there is thus provided a device of the character described, possessing the particular features of advantage before enumerated as desirable, but which, obviously is susceptible of modification in its form, proportions, detail construction and arrangement of parts without departing from the principle involved, or sacrificing any of its advantages.

While in order to comply with the statute, the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. A pulsator mechanism of the class embodying a pulsator valve, and fluid pressure operated means for alternating said valve, characterized by a free floating unattached control valve capable of both reciprocatory and oscillatory movement governing the action of the fluid pressure upon said operating mechanism, and means to reverse said valve by the action of said operating mechanism.

2. A pulsator of the class embodying a pulsator valve, and fluid pressure operated mechanism for alternating said valve, characterized by a free floating control valve governing the action of the fluid pressure upon said operating mechanism, a spring, means for shifting said valve to place said spring under tension, and a guide for directing said valve to its alternate position upon the subsequent retraction of said spring.

3. The combination with a pulsator valve and fluid pressure operated mechanism for alternating said valve, of a control valve governing the action of the fluid pressure upon said operating mechanism, an actuating spring therefor and means for shifting said valve against the tension of said spring whereby said spring upon its retraction will actuate the valve to its alternate position.

4. The combination with a pulsator valve and fluid pressure operated means for alternating said valve, of a valve seat having ports therein, a free floating valve member held in operative engagement with the valve seat by air pressure governing the action of the fluid pressure upon the operating mechanism, and means for retracting the valve through a different path of travel to an alternate position.

5. The combination with a pulsator valve and fluid pressure operated means for actuating the same, of a control valve governing the action of the fluid pressure upon said operating means, an actuating spring therefor; said fluid pressure operated means being adapted to shift said valve to place said spring under tension, said spring being adapted upon its retraction to actuate the valve to an alternate position.

6. The combination with fluid pressure operated pulsator mechanism, of a control valve governing the action of the fluid pressure upon said mechanism, an actuating spring therefor, a cam member actuated by said fluid pressure operated mechanism to shift said valve against the tension of said spring, said cam member being adapted upon the retraction of the spring to guide the valve to an alternate position.

7. The combination with fluid pressure operated pulsator mechanism of a control valve governing the action of the fluid pressure upon said mechanism, means for actuating said valve and guiding means therefor whereby one end of the valve member will be reciprocated in a substantially straight path of travel and the opposite end of the valve member will be oscillated to and fro to alternate operative positions.

8. The combination with fluid pressure operated pulsator mechanism of a control valve governing the action of the fluid pressure upon said mechanism, actuating means therefor and means for guiding said valve throughout a substantially V shaped path of travel to alternate operative positions.

9. The combination with fluid pressure operated pulsator mechanism, of a movable control valve governing the action of the fluid pressure upon said mechanism, and an oscillatory member actuated to and fro by said fluid pressure operated mechanism and having a substantially V shaped cam surface, the path of travel of which intersects that of the control valve and adapted to shift said valve alternately from one side of said oscillatory member to the other to alternate operative positions, substantially as specified.

10. The combination with fluid pressure operated pulsator mechanism, of a movable control valve governing the action of the fluid pressure upon the said mechanism, a substantially V shaped cam surface upon said valve, and an oscillatory member actuated to and fro by the said fluid pressure operated mechanism, the path of travel of which intersects that of the valve, and adapted by its engagement with the V shaped cam surface of said valve to shift said valve alternately from one side of said oscillatory member to the other to alternate operative positions, substantially as specified.

11. The combination with fluid pressure operated pulsator mechanism, of a movable control valve governing the action of the fluid pressure upon said mechanism, an actuating member shifted to and fro by the said fluid pressure operated mechanism the path of travel of which intersects that of the said valve, and a substantially V shaped cam surface upon one of said members engaged by the other member upon the to and fro movement of the actuator whereby the valve is alternately shifted from one side to the other of said actuator to alternate operative positions.

12. The combination with fluid pressure operated pulsator mechanism, including two independent intake ports adapted to be connected with teat cups and a suction passage with which said ports are to be alternately connected, a movable control valve adapted to govern the action of the fluid pressure on said mechanism, of an oscillatory member actuated to and fro by said mechanism, one end of said member having a passage way therein adapted upon movement of said member to alternately connect said ports with the suction passage, the opposite end of said member engaging with and actuating the control valve to alternate positions upon said to and fro movement of said oscillatory member, substantially as specified.

13. The combination with a plurality of teat cups, each having a teat receiving chamber and a pulsating chamber independent of said teat receiving chamber, fluid pressure operated pulsator mechanism, including two independent intake ports to be connected with the pulsating chambers of said teat cups and a suction passage with which said ports are alternately connected, a control valve governing the action of the fluid pressure upon said mechanism, of a valve portion adapted to alternately connect said ports with said suction passage, and an actuating member under control of said mechanism common to both valves.

14. The combination with fluid pressure operated pulsator mechanism, a control valve governing the action of the fluid pressure upon said mechanism, a pulsator valve, and a pivoted actuating member common to both valves oscillated to and fro by said mechanism.

15. The combination with fluid pressure operated pulsator mechanism, a control valve governing the action of the fluid pressure upon said mechanism, and a pulsator valve, of an intermediate connection between the control valve and pulsator valve actuated by said mechanism to effect the reversal of both of said valves.

16. In a pulsator mechanism, a single integral body comprising a pail lid and mounting for fluid pressure operated mechanism, fluid pressure operated mechanism thereon comprising a reciprocatory piston, a pulsator valve actuated by the reciprocation of said piston, and a control valve governing the action of the fluid pressure on said piston, said integral body having therein a passage way leading to the fluid pressure operated mechanism and a branch passage embodied therein leading to the under side of the pail lid portion of the body, and hence communicating with the pail to which said body may be fitted.

17. In a pulsator mechanism, a main frame including a base or standard, fluid pressure operated mechanism carried by the main frame comprising a reciprocatory piston, a pulsator valve actuated by the reciprocation of said piston, and a control valve governing the action of the fluid pressure on said piston, said main frame having therein a passage way for actuating fluid leading to the said fluid pressure operated mechanism, and a branch passage way through said base or standard to the under side thereof, substantially as specified.

18. In a pulsator mechanism adapted to be mounted upon a pail or receiver, a main frame, fluid pressure operated mechanism carried thereby comprising a reciprocatory piston, a pulsator valve actuated by the reciprocation of said piston, and a control valve governing the action of the fluid pressure on said piston, said main frame having a suction passage way embodied therein communicating with the pail or receiver.

In testimony whereof, I have hereunto set my hand this 22nd day of November, A. D. 1918.

JOHN G. G. EKLUNDH.

Witnesses:
H. J. OSSING,
J. A. SCHMITT.